Oct. 17, 1950 — C. W. CRUMRINE — 2,526,602

RECEPTACLE KIT

Filed Oct. 31, 1946 — 2 Sheets-Sheet 1

INVENTOR
Chester W. Crumrine
BY
Beau, Brooks, Buckley & Beau.
ATTORNEYS

Oct. 17, 1950
C. W. CRUMRINE
2,526,602
RECEPTACLE KIT
Filed Oct. 31, 1946
2 Sheets-Sheet 2
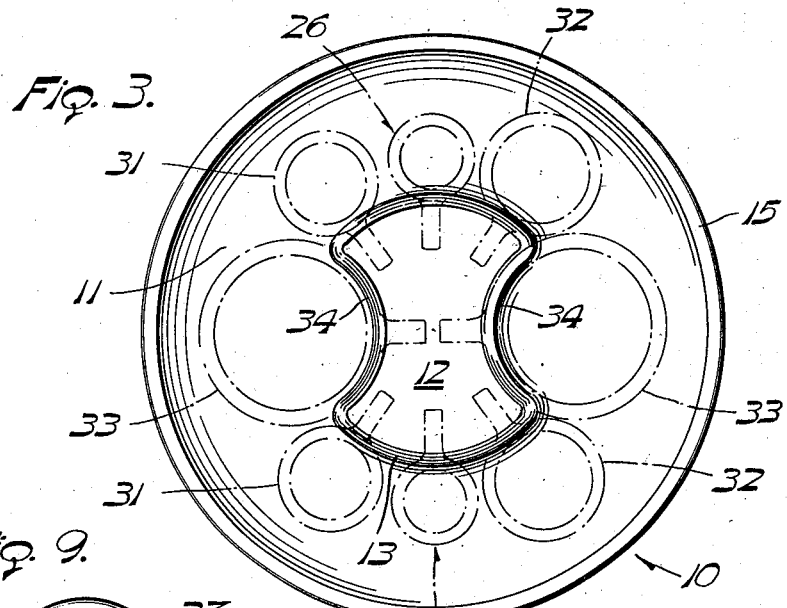
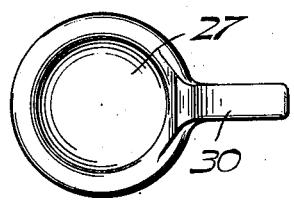
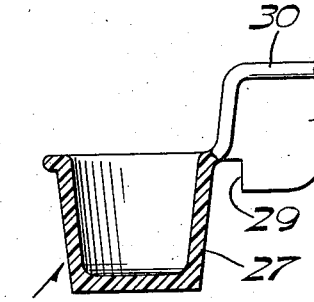
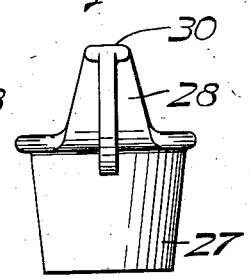
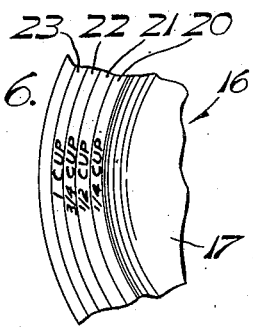
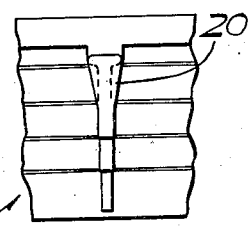
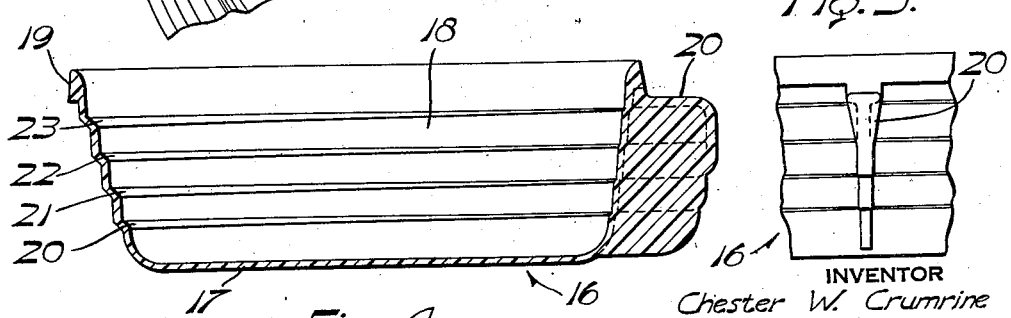
INVENTOR
Chester W. Crumrine
BY
Bean, Brooks, Buckley + Bean.
ATTORNEYS Patented Oct. 17, 1950

2,526,602

UNITED STATES PATENT OFFICE 2,526,602

RECEPTACLE KIT

Chester W. Crumrine, Rochester, N. Y., assignor to Product Technicians, Inc., Rochester, N. Y.

Application October 31, 1946, Serial No. 706,945

8 Claims. (Cl. 206—1)

This invention relates to measuring devices particularly for domestic use.

Various sets of measuring implements have previously been proposed, some wherein a number of graduated measuring receptacles are interconnected in various ways, and others wherein a single measuring receptacle is graduated at different levels to indicate various amounts. Interconnected receptacles are usually awkward to use and difficult to clean. On the other hand, accurate measurement of relatively small quantities cannot be achieved by using a single graduated container, especially so in the case of nonliquid materials.

The present invention provides a related series of receptacles for measuring relatively small quantities of either dry or liquid material, quantities ranging generally from fractions of a teaspoonful to a tablespoonful. According to the present invention, the related measuring receptacles all have special similar handle formations which cooperate with a holder or housing device for a series of receptacles to permit the receptacles to be readily assembled with the holder when not in use.

Further, the holder or housing comprises a base or supporting element and a relatively deep top or cover element which cooperates therewith to form the complete housing and is also conveniently usable as a measuring cup for measuring relatively larger quantities of material, thus extending the useful measuring range of the apparatus of the present invention from a minimum of a fraction of a teaspoonful to a maximum of one cup.

Various objects and advantages not specifically referred to above will be apparent from a reading of the following detailed description in conjunction with the accompanying drawings. It is to be understood that the principles of the invention are not limited to the precise form illustrated by way of example, and that various modifications may be made without departing from the spirit of the invention, which is limited only as defined in the appended claims.

In the drawings:

Fig. 3 is a detailed top plan view of the holder or base element of the device;

Fig. 4 is a longitudinal cross-sectional view of the combined cover and measuring cup element of the device in position for use as a measuring cup;

Fig. 5 is a fragmentary elevational view thereof at right angles to Fig. 4;

Fig. 6 is a top plan view of a side edge portion of the measuring cup-cover element of Figs. 4 and 5;

Fig. 7 is a side elevational view, partially in cross-section, of one of the smaller measuring cup elements of the device;

Fig. 8 is an end elevational view thereof; and

Fig. 9 is a top plan view thereof.

Figure 1:
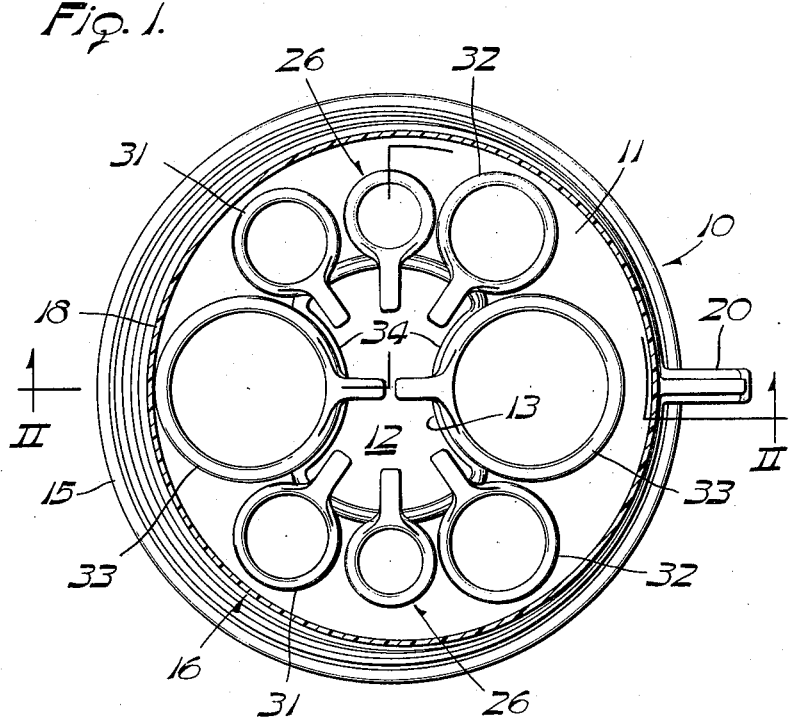
Fig. 1 is a top plan view of a preferred form of the assembled measuring device with the cover element thereof shown in cross-section as indicated by the line I—I of Fig. 2.
Figure 2:
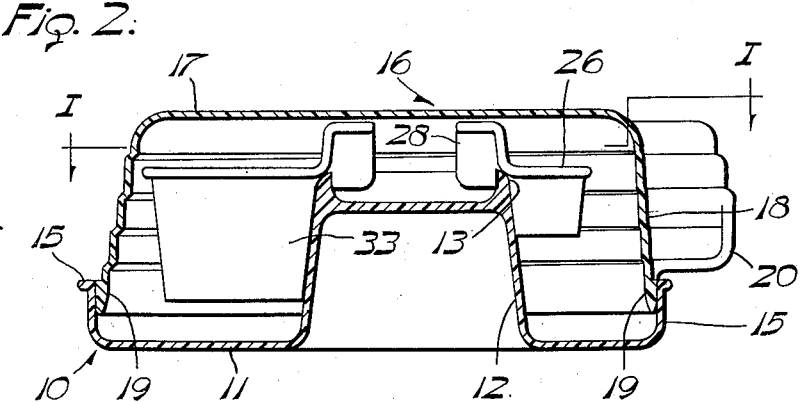
Fig. 2 is an irregular cross-sectional view through the assembly of Fig. 1 as indicated by the line II—II thereof.

Throughout the several figures of the drawings like characters of reference denote like parts, and, referring particularly to Figs. 1, 2, and 3, the numeral 10 designates generally a base or holder which has a bottom wall 11 and a central raised portion 12. The raised portion 12 is generally of hourglass form and has an upwardly projecting marginal rim 13 which cooperates in the retention of individual measuring receptacles in a manner which will presently appear.

The outer margin of holder 10 has an upstanding annular flange 15 which cooperates with a combined cover element and measuring cup which is designated generally at 16 in Figs. 1 and 2 and comprises a horizontal wall 17 and an annular wall 18, the outer edge of which comprises a terminal bead 19 which, in the illustrated form, has a light press fit within the flange 15 of holder 10. An integral handle 20 is formed on the annular wall 18 of element 16 for use both in handling the assembled device and as a handle for element 16 when it is serving as a measuring cup.

It will be noted that annular wall 18 of element 16 comprises a series of eccentric stepped portions which form a series of lands 20 through 23. Because of the eccentricity of the stepped portions of annular wall 18, the lands are of small dimension and they may in fact be non-existant at the right-hand side of element 16 as viewed in Figs. 2 and 4. However, these lands are of sufficient dimension at the left-hand side of element 16 to receive a series of indicia as shown in the fragmentary view, Fig. 6.

Figs. 7, 8, and 9, show, on an enlarged scale, the smallest of a series of individual measuring cups which, when not in use, are adapted to be assembled about the raised portion 12 of holder 10, firmly retained by ridge 13 thereof. The cup shown in detail in Figs. 7, 8, and 9 is designated generally 26 in Figs. 1 and 2 and may, by way of example, have a capacity of one-fourth teaspoonful. Cup 26 may comprise a cup portion proper 27 and a handle 28 which comprises generally a vertical flange. The lower edge of flange 28 is notched at its inner end as at 29 to hook over ridge 13 as shown in Fig. 2. In the form illustrated by way of example, flange 28 has a horizontal reinforcing flange 30 along its inner and upper edges.

The proportions are such that upper flange 30, when the cup is assembled with holder 10, lies just beneath the horizontal portion 17 of cover element 16, whereby the individual measuring cups are held against displacement from ridge 13 during shipping or other handling of the assembled device.

Referring particularly to Fig. 1, it will be noted that in the illustrated form two one-fourth teaspoonful cups 26 are provided. In addition, two one-half teaspoonful cups 31, two one-teaspoonful cups 32 and two one-tablespoonful cups 33 are provided. Each of the cups 31 through 33 have handle portions which are identical with the handle of cup 26 which has been described in detail. It will be noted that convex portions 34 at opposite sides of central raised portion 12 conveniently accommodate the largest cups 33 which nevertheless assemble over ridge 13 in the same manner as the other individual cups, as appears from Fig. 2.

What is claimed is:

1. A receptacle kit comprising a holder for a plurality of measuring devices, said holder including a base portion and a central raised portion, a series of measuring receptacles each including an outwardly extending handle element, said central raised portion having means at its upper marginal edge for interlocking engagement with said handle elements to retain said series of receptacles disposed about said raised portion, a relatively low outer marginal flange extending upwardly from the base portion of said holder, and a cover element comprising, in assembled position, an inverted cup-shaped member having its rim portion interfitting with said outer marginal flange and its horizontal wall portion disposed to closely overlie said series of receptacles to retain the entire device in properly assembled position.

2. A receptacle kit comprising a holder for a plurality of measuring devices, said holder including a base portion and a central raised portion, a series of measuring receptacles each including an outwardly extending handle element having a notch in its lower edge, said central raised portion having an upwardly directed marginal flange for interlocking engagement with the notches of the several handle elements to retain said series of receptacles disposed about said raised portion, a relatively low outer marginal flange extending upwardly from the base portion of said holder, and a cover element comprising, in assembled position, an inverted cup-shaped member having its rim portion interfitting with said outer marginal flange and its horizontal wall portion disposed to closely overlie said series of receptacles to retain the entire device in properly assembled position.

3. A receptacle kit comprising a holder for a plurality of measuring devices, said holder including a base portion and a central raised portion, a series of measuring receptacles each including an outwardly extending handle element, said central raised portion having means at its upper marginal edge for interlocking engagement with said handle elements to retain said series of receptacles disposed about said raised portion, a relatively low outer marginal flange extending upwardly from the base portion of said holder, and a cover element comprising, in assembled position, an inverted cup-shaped member having its rim portion interfitting with said outer marginal flange.

4. A receptacle kit comprising a holder for a plurality of measuring devices, said holder including a base portion and a central raised portion, a series of measuring receptacles each including an outwardly extending handle element having a notch in its lower edge, said central raised portion having an upwardly directed marginal flange for interlocking engagement with said handle elements to retain said series of receptacles disposed about said raised portion, a relatively low outer marginal flange extending upwardly from the base portion of said holder, and a cover element comprising, in assembled position, an inverted cup-shaped member having its rim portion interfitting with said outer marginal flange.

5. A receptacle kit comprising a holder for a plurality of measuring devices, said holder including a base portion and a central raised portion, a series of measuring receptacles each including an outwardly extending handle element having a notch in its lower edge, said central raised portion having an upwardly directed marginal flange for interlocking engagement with the notches of the several handle elements to retain said series of receptacles disposed about said raised portion, and a cover element comprising, in assembled position, an inverted cup-shaped member having its rim portion interfitting marginally with said base portion and its horizontal wall portion disposed to closely overlie said series of receptacles to retain the entire device in properly assembled position.

6. A receptacle kit comprising a holder for a plurality of measuring devices, said holder including a base portion and a central raised portion, a series of measuring receptacles each including an outwardly extending handle element, said central raised portion having means at its upper marginal edge for interlocking engagement with said handle elements to retain said series of receptacles disposed about said raised portion, and a cover element comprising, in assembled position, an inverted cup-shaped member having its rim portion interfitting marginally with said base portion and its horizontal wall portion disposed to closely overlie said series of receptacles to retain the entire device in properly assembled position.

7. A receptacle kit comprising a holder for a plurality of measuring devices, said holder including a base portion and a central raised portion, a series of measuring receptacles each including an outwardly extending handle element having a notch in its lower edge, said central raised portion having an upwardly directed marginal flange for interlocking engagement with the notches of the several handle elements to retain said series of receptacles disposed about said raised portion, and a cover element comprising, in assembled position, an inverted cup-shaped member having its rim portion interfitting marginally with said base portion.

8. A receptacle kit comprising a holder for a plurality of measuring devices, said holder including a base portion and a central raised portion, a series of measuring receptacles each including an outwardly extending handle element, said central raised portion having means at its upper marginal edge for interlocking engagement with said handle elements to retain said series of receptacles disposed about said raised portion, and a cover element comprising, in assembled position, an inverted cup-shaped member having its rim portion interfitting marginally with said base portion.

CHESTER W. CRUMRINE.

REFERENCES CITED

The following references are of record in the file of this patent:

UNITED STATES PATENTS

| Number | Name | Date |
| --- | --- | --- |
| 471,517 | Barry et al. | Mar. 22, 1892 |
| 1,781,056 | Elder | Nov. 11, 1930 |
| 2,232,738 | Serr | Feb. 25, 1941 |